Figure 1:
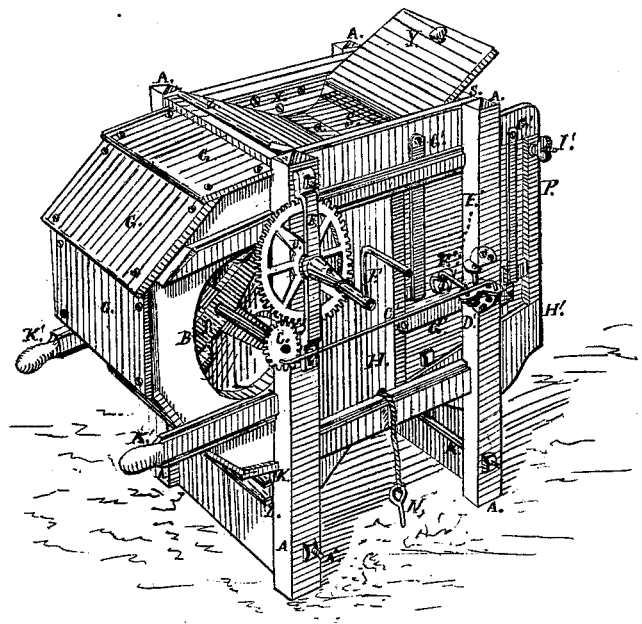

C. ALTRINGER.
Improvement in Fanning-Mills.

No. 126,371.  Patented May 7, 1872.

126,371

UNITED STATES PATENT OFFICE.

CHRISTOPHER ALTRINGER, OF RACINE, WISCONSIN.

IMPROVEMENT IN FANNING-MILLS.

Specification forming part of Letters Patent No. 126,371, dated May 7, 1872.

SPECIFICATION.

I, CHRISTOPHER ALTRINGER, of Racine, in the county of Racine, in the State of Wisconsin, have invented certain Improvements in Fanning-Mill, of which the following is a specification:

Nature and Object of the Invention.

My invention consists in an improvement in fanning-mills for cleaning grain. My mill is in the usual form, but has several new and important improvements. The side-boards are constructed so that they will not split. The semicircle which contains the fan is made partly round and partly in squares. The principal driving-wheel is made adjustable. The front end of the shoe-apron is fastened to snips, and those fastened to the front end of the shoe holding it together—the cut-off directing the grain in separate parcels or together. The front girt is stepped in between the parts without mortises, making the shoe-eye adjustable. The above are the principal features in this fanning-mill claimed to be new.

Description of the Drawing forming part of the Specification.

Figure 2:
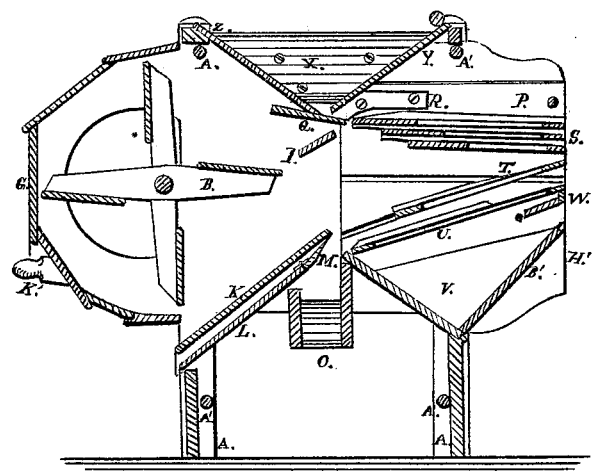

Figure 1 is a perspective view of my invention, and Fig. 2 a longitudinal sectional view.

A is the frame-work of the mill, fastened together with rods, so that the mill can be made complete at the factory and shipped to any point desired, and then put up ready for use; B, the fan; C, the fan-axle and pinion on the end of it; D, the main driving-wheel meshing into pinion C; E, an adjustable guard, which secures the wheel D to the frame. This guard has oblong holes in the ends, through which pass bolts with nuts on them, which hold the guard and make it adjustable by giving room for it to be moved up or down. F, the crank on the shaft of wheel D to propel it with; G, the semicircle, which incloses the fan, round at the bottom, and the rest of the way made in squares. H is a side board, running up and down, and is made whole and without any cutting out for the shoe to play in, as is usual, and together with the end board H' is nailed to the frame, the shoe playing between. I is a wind-board; K, the upper grain-board; L, the under grain-board; M, a cut-off hinged to the grain-board L, and to which is attached a string and pin N to hoist it up with and divide the grain, making a part pass over the upper board, and the balance down through the spout O as the sieves may be arranged, dividing the grain into coarse and fine grain, or the grain may be all thrown down through spout O; or if the cut-off is let down, then all the grain will pass over the two grain-boards and fall out under the fan-circle. P is the shoe which holds the sieves; Q, the shoe-apron fastened to snips R, which are fastened to the shoe, thus holding the front end of the shoe together. One-half of this apron and one of the snips are shown in Fig. 2; S, a gang of sieves in the shoe fastened together; T, a single sieve, which carries the grain onto the grain-board K; U, a single sieve, which carries the grain down to the opening O, or on to the cut-off M, if it is down. The cockle and other fine seeds are sifted through this sieve and fall into box V. W is a board under the sieve U, let into the shoe; X, a hopper, into which the grain is to be poured to be cleaned; Y, a feed-board to regulate the feed of the grain to the mill; Z, the front girt without mortises, let in between the posts or frame of the mill, and the hopper is nailed to this girt; A', rods, which hold the mill together; B', a slide to raise to let the cockle out of box V; C', rod from pinion C to iron D' hung to an iron on the frame A with a pin through it; E', hook from iron D', hooking into eye F'. This eye F' is made with slots in it, so that it may be adjustable and fastened at the right height for iron D' and hook E', and fastened to the side of the shoe P, so that as the fan is made to revolve the shoe will be thrown in and out, and made to vibrate and agitate the grain as it falls on the sieves. G' are springs fastened to the frame-work and to the shoe, so that the shoe may have lateral play. I' is a rod, which holds the back end of the shoe together. K' are the handles of the fanning-mill, slotted so as to fit onto the semicircle which covers the fan.

This arrangement of parts is valuable in what is called "knock-down fanning"-mills, or mills that are made at the shop and then shipped in parts and put together whenever wanted to be used. In this way the fanning-mills can be shipped at much less expense than they can be when put together before shipment. The side-board H running up and down the mill, and whole, not cut away in any particular, and the end board H' is also whole; and the manner in which they are nailed to the mill, prevents their being split or injured in any manner; and they are thought to be entirely different from any mill in use. The semicircle constructed round at the bottom to fit the fan, and the rest of it in squares, as described, is useful in "knock-down mills," for the reason that the squares can all be finished and painted at the shop, and whenever necessary to put them together they will all come together and the paint will not be marred, and the handles grooved for the squares to fit in are all peculiarly adapted for such mills. The adjustable guard E securing wheel D in position is valuable, for the reason that when the mill is put together the wheel can be adjusted without trouble and made to mesh into pinion C. The shoe-apron, fastened to snips R and they, in turn, fastened to the shoe, hold the front end of the shoe together. This arrangement is very handy in this kind of mill. The cut-off M is hinged to the lower board L, and operates to throw all the grain over the two boards K and L, or a portion of the grain may pass over the board K, and the balance down through spout O. This cut-off M is for the purpose of controlling the grain and dividing it as may be desired, or letting it all pass in one direction. The girt Z is without mortises for the purpose of being slipped into place between the posts or frame of the mill and nailing the hopper to it. This greatly facilitates the putting of these mills together. The shoe P and hook E' and adjustable cover F' are for the purpose of vibrating and agitating the grain as it falls on the sieves, and F' is made with slots in it, so that it may be adjusted to the right height.

Claims.

I claim as my invention—

1. In combination with the shoe P and apron Q attached in the manner described, the hook E and adjustable ear F', substantially as and for the purpose set forth.

2. The fanning-mill herein described, consisting chiefly of the frame A, side boards H, end board H', hopper X, girt Z, shoe P, apron Q, snips R, fan-wheel B, adjustable driving-wheel D, pinion C, fan-case G, partly circular and partly polygonal in form, boards K L, cut-off M, and spout O, all constructed and arranged to operate substantially as described.

CHRISTOPHER ALTRINGER.

Witnesses:
N. WEINS,
SAML. RITCHIE.